United States Patent [19]

Scully et al.

[11] Patent Number: 4,831,552
[45] Date of Patent: May 16, 1989

[54] METHOD FOR CONCURRENTLY DISPLAYING ENTRIES FROM A PLURALITY OF DIFFERENT ELECTRONIC CALENDARS BASED ON INTERACTIVELY ENTERED NON-TEMPORAL CRITERIA

[75] Inventors: Keith J. Scully, Austin, Tex.; Harinder S. Singh, Boca Raton, Fla.

[73] Assignee: International Business Machines Corporation, Armonk, N.Y.

[21] Appl. No.: 8,034

[22] Filed: Jan. 29, 1987

[51] Int. Cl.$^4$ ............................................. G06F 15/40
[52] U.S. Cl. .................................... 364/518; 364/521; 340/706
[58] Field of Search ............................ 368/29, 10, 43; 340/706, 717; 364/521, 200 MS File, 518

[56] References Cited

U.S. PATENT DOCUMENTS

| | | | |
|---|---|---|---|
| 4,194,196 | 3/1980 | Mohiuddin | 340/711 |
| 4,591,840 | 5/1986 | Curtis et al. | 340/706 |
| 4,626,836 | 12/1986 | Curtis et al. | 340/706 |
| 4,645,238 | 2/1987 | Vincent et al. | 283/67 |

OTHER PUBLICATIONS

Rothfeder, "*Time is of the Essence*", Personal Computing, Jun. 83, pp. 56-61.
Sudyam, "*Time Management: Business in Its Finest Hour*", Personal Computing, 3/82, pp. 34-40.

Primary Examiner—Gary V. Harkcom
Assistant Examiner—Phu K. Nguyen
Attorney, Agent, or Firm—Richard E. Cummins

[57] ABSTRACT

An electronic calendaring method for use in a data processing system that has a plurality of interactive type work stations connected directly or indirectly to a host processing unit. The method assists a calendar owner to request the system to develop and display a composite calender comprising entries from a plurality of calendars within a specified time span which have been selected by criteria entered interactively into the system by the calender owner. The criteria entered are not limited to "free periods" nor system established terminology but can include terms established by the calendar owner community.

12 Claims, 6 Drawing Sheets

MOVE THE CURSOR TO EACH SELECTION OR KEY THE ITEM DIRECTLY AND HIT ENTER

1. Calendar Entry, Meeting,
   Appointment, Trigger,
   Note, Vacation,
   Holiday, Offsite,
   Not Normal Work Hours

```
                        1  2
    3  4  5  6  7  8  9
   10 11 12 13 14 15 16
   17 18 19 20 21 22 23
   24 25 26 27 28 29 30
   31
   ```

2. View Select

3. Composite Calendar

```
       1  2  3  4  5  6
    7  8  9 10 11 12 13
   14 15 16 17 18 19 20
   21 22 23 24 25 26 27
   28 29 30
   ```

Command: _____

PF1=Help    PF2=Return to System    PF8=Next Screen

MOVE THE CURSOR TO EACH SELECTION OR KEY THE ITEM DIRECTLY THEN HIT ENTER
Classification List: 1 Meeting  2 Appointment  3 Offsite  4 Vacation  5 Holiday
                     6 Note  7 Not Normal Work Hours
Additional Criteria: BX Priority X (X=1 to 10)  C Open Time
                     D User Defined Field (D+ 8 Characters)
CLASSIFICATION: 1   (Select one classification number from the above list)
USER DEFINED FIELD _____    PRIORITY  02   (1=highest,10=lowest)
EVENT IDENTIFIER: D35 MEETING A1
MEETING/APPOINTMENT INFORMATION:
        Date 10/07/86    Start Time:1:15 PM    End Time: 5:00 PM
        Date 10/09/86 R2 Start Time:8:30 PM    End Time: 5:00 PM
     (Rx after Date will repeat the event at the same time, x number of days)
     Names List : D35 NAMES A1
        Caller  : TOM ROBERTS
        Subject : 1987 Budget
        Place   : Conference Room 128F
        Details:_____
     AUTO SCHEDULE: YES  NO      EVENT DURATION(minutes):   (1 TO 480)
     SEARCH CRETERIA;2+C+A 1+C+A
     Enter the classification /criteria Number separated by a space. Select from
     the list above. Enter selections using the following format:
     Classification+(C-Confirmed or T-Tentative)+(A-Attending or M-May Attend)

PF1=Help   PF3=Cancel  PF5=Send Notice  PF6=Begin Search
     PF8=Next Screen(Security, Status, Trigger)  PF9=File  PF11=Add One Line

FIG. 3b

```
MOVE THE CURSOR TO EACH SELECTION OR  KEY  THE ITEM  DIRECTLY  AND  HIT  ENTER

SECURITY:      Public    Shared    Private
  (pick one)
STATUS:        Tentative          Confirmed
  (pick one)
TRIGGER:       Message    Audio    Process
  (All three may be picked)
    Date: 10/07/86       Time: 1:00 PM
    Date: 10/09/86       Time: 8:00 AM
  (PF11 will scroll and add additional Date Lines while on the Date line)
  (Rx after Date will repeat the event at the same time, x number of days)
    Names List: D35/AUSVM1 (Enter The Notification List VNET Address)
    Message   : The department meeting starts in 15 minutes_____
                (PF11 will add one line)
    Process   : INVEST01/AUSVM1   Enter The Process VNET Address
                Pick up these calculations before the Budget Meeting TRIGGER FIXED OR FLOAT?      Fixed      Float
  (pick one)
    Float with Event Identifier:  D35 MEETING A1
  (If this event moves, the trigger will be moved to the same relative time)

PF1=Help    PF3=Cancel   PF5=Send Notice  PF6=Begin Search
PF7=Previous Screen  PF8=Next Screen   PF9=File   PF10=Add One Line
```

FIG. 3C

MOVE THE CURSOR TO EACH SELECTION OR KEY THE ITEM DIRECTLY THEN HIT ENTER

VIEW SELECT (If no classification, user defined field or priority is selected,
all categories are returned in the view swlwct)

VIEW CRITERIA 1+C+a 2+c+m 3 4 5 D+SEPTEMBE
(Enter the criteria NUMBER separated by a space. Select from the lists below)
(Select Classifications using the following format))
Classification+(C-Confirmed or T-Tentative)+(A-Attending or M-May Attend)

Classification List: 1 Meeting  2 Appointment  3 Offsite  4 Vacation  5 Holiday
                    6 Note  7 Not Normal Work Hours  8 Date and Time Only
                    9 Trigger
Additional View Criteria: A Private Entries  BX Priority X (X=1 to 10)
                         C Open Time  D User Defined Field (D+ 8 Characters)

SPECIFIC ENTRY: D35 MEETING A1 (Select a specific entry name)

VIEW REQUEST DISTRIBUTION LIST NAME: D35 MEETING A1

VIEW TIME SPAN(S)  Date: 10/07/86  Start Time: 1:15 PM  End Time 5:00 PM
                   Date: 10/09/86  Start Time: 8:30 PM  End Time 5:00 PM PF1=Help   PF3=Cancel  PF4=Next Command Line  PF5=Start View Select
   PF7=Previous Screen  PF8=Next Screen  PF9=File  PF11=Add One Line

FIG. 4a

MOVE THE CURSOR TO EACH SELECTION OR KEY THE ITEM DIRECTLY THEN HIT ENTER

VIEW COMPOSITE CALENDARS  (View Select must be used before this frame)

COMPOSITE SUMMARY: YES   NO  (Selects a composite for the individuals selected
                              or for the entire Names List used in the View
                              Select)
SPECIFIC INDIVIDUAL(S)  SCULLY/AUSVM1 (Enter the VNET address or nickname)
                        (PF11 adds lines to select other individuals)

SPECIFIC ENTRY D35 MEETING A1  (Select a specific entry name)

VIEW REQUEST DISTRIBUTION LIST NAME:  D35 NAMES A1

VIEW TIME SPAN(S):  Date: 10/07/86   Start Time: 1:15 PM  End Time: 5:00 PM
                    Date: 10/09/86   Start Time: 8:30 PM  End Time: 5:00 PM VIEW FORMAT:   DAY  WEEK  MONTH  SIX MONTH  (This overrides View Time Span)

PF1=Help   PF3=Cancel  PF4=Next Command Line  PF5=Start View Select
PF7=Previous Screen    PF8=Next Screen    PF9=File  PF11=Add One Line

Fig. 4b

METHOD FOR CONCURRENTLY DISPLAYING ENTRIES FROM A PLURALITY OF DIFFERENT ELECTRONIC CALENDARS BASED ON INTERACTIVELY ENTERED NON-TEMPORAL CRITERIA

FIELD OF INVENTION

This invention relates in general to electronic calendaring methods, and in particular, to a calendaring method in which a calendar owner can select a subset of entries from different calendars based on criteria that is entered interactively by the calendar owner.

CROSS-REFERENCES TO RELATED APPLICATIONS

1. Co-pending application Ser. No. 008,039 filed concurrently herewith, entitled "Electronic Calendaring Method to Establish Calendar Floating Triggers for Calendared Events and Processes" and assigned to the assignee of this application is directed to an electronic calendaring method in which a calendar owner can selectively trigger a predefined action and response to detecting one or more criteria related to the calendar event that has previously been defined and entered into the system.

2. Co-pending application Ser. No. 008,249 filed concurrently herewith, entitled "Method For Automatically Reconciling Entries on Two Copies of Independently Maintained Electronic Calendars," and assigned to the assignee of this application is directed to an electronic calendaring method in which a calendar owner who keeps a detached personal copy of his master calendar can automatically reconcile the calendar entries that have been made on each calendar copy, independently of the other since the last time the detached copy was made and interactively resolve calendar event conflicts.

3. Co-pending application Ser. No. 008,038 filed concurrently herewith, entitled "Electronic Calendaring Method Which Provides for Automatic Assignment of Alternates In Requested Events," and assigned to the assignee of this application is directed to an electronic calendaring method in which a calendar owner who receives a request to participate in a calendar event originated by another calendar owner, and currently being calendared by that owner, can establish an automatic response which reflects the assignment of an alternate to the event based on the relationship of the information that accompanies the request and criteria that the calendar owner has pre-established for each potential alternate.

4. Co-pending application Ser. No. 008,036 filed concurrently herewith, entitled "Electronic Calendaring Method for Automatic Confirmation of Resource Availability During Event Calendaring", and assigned to the assignee of this application is directed to an electronic calendaring method in which a calendar owner, when calendaring an event such as a meeting, which requires, in addition to a meeting room, such articles as a projector, video conferencing equipment, etc., automatically receives confirmation that requested articles are available and reserved for the calendared meeting event.

5. Co-pending application Ser. No. 008,033 filed concurrently herewith, entitled "Method For Developing Automatic Automatic Replies in an Interactive Calendaring System" and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

BACKGROUND ART

The prior art has disclosed a number and variety of interactive electronic calendaring systems and method. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems. Hence, the term "electronic calendaring."

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring methods generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network. Usually these networks have been established to permit the users to interact with each other and with data maintained on the system. In this environment, a user at a terminal or workstation can send a message to one or more of the other users on the network concurrently, and is notified when the addressees have received and read the message. In most of these environments, each user generally maintains a calendar, and in many of these environments the reason for having a network in which users interact, quite often involves user interaction that requires reference to the respective electronic calendars of the users. A considerable amount of time is therefore spent by calendar users in many organizations, with people checking and rearranging their calendars to accommodate various events such as meetings and presentations. Calendar systems have progressed to the point where a person who is calling a meeting can at least view the calendars of a number of users that he intends to invite to a meeting, in order to determine a common available time for the meeting. (U.S. Pat. No. 4,626,836 is an example of such a system).

In this prior art system, a screen is presented to the meeting originator which requests the data necessary for the system to determine times that all potential attendees would be available. The data requested includes, for example, the length of the meeting, a time period during which the meeting should be conducted, the place of the meeting and the names of the attendees. Based on this data, the method returns a screen of available times after inspecting each attendee's day calendar during the time period for free time slots or periods.

The originator then selects the beginning time and end time of the meeting, including the time and date, and invitations are automatically sent to all the attendees, requesting their attendance at the scheduled meeting.

While such an automatic system saves time in finding a convenient meeting time, relative to the manual process, the process is limited to the scheduling of meetings based on "free time" as represented by the absence of a calendar entry on each of the inspected calendars. This approach does not recognize that some calendar entries are less important than others and, in practice, it is often impossible to find a common period of "free time" for a meeting that involves a large group of people or a meeting involving a number of people whose work requires a large number of meetings.

The prior art systems are limited to examining calendars of others in connection with setting up a meeting. It was soon recognized that there were other situations besides calling a meeting where it would be beneficial to be able to create a "selected view" of a number of individual calendars.

A department manager, for example, may have an assignment that can be given to a number of different people in his department. If the calendaring system could display to the manager the calendared events of each of these people which meet a set of search criteria entered into this system interactively by the manager, considerable time and effort could be saved by everyone involved. While time available or free time may be one of the search criteria entered, other criteria such as the relative importance of the events that are calendared to the new assignment, might also provide the manager with more relevant data than just free time. Also, identifying the person who handled the same or similar assignment in the past, similar assignments scheduled in the future or other assignments scheduled at the same geographic location or customer could be important criteria for the manager to employ. These deficiencies of the prior art electronic calendaring methods, namely using only free time to find relevant calendar entries, are overcome by the present invention.

SUMMARY OF THE INVENTION

In accordance with the present invention, an electronic calendaring method is provided in which a calendar owner can request the system to display or print out a selected subset of calendar entries from a plurality of calendars maintained by the electronic calendaring system. The method assists the calendar owner in defining the selected subset by presenting to him a "view select" screen containing various prompts to which he responds by keying in the search criteria that he wishes to employ, to determine if a calendar entry belongs to the subset. The subset is then displayed in one or more composite screens. Since criteria other than free time may be employed in defining the selected subset, the "view select" function can be used separately or to provide enhancements to other electronic calendaring functions such as the automatic scheduling of meetings.

It is therefore an object of the present invention to provide an improved electronic calendaring method.

A further object of the present invention is to provide an electronic calendaring method in which a subset of calendar entries from more than one electronic calendar can be automatically selected.

A still further object of the present invention is to provide an improved electronic calendaring method in which a calendar owner can request a composite display of selected calendar entries from a plurality of electronic calendars, which entries are selected based on interactively entered search criteria other than free time.

Another object of the present invention is to provide an electronic calendaring method in which a calendar owner is assisted in defining to the system, search criteria based on an assignment of priorities to calendar entries to be used by the system in selecting calendar entries from different calendars maintained by the system for a subsequent concurrent display to the calendar owner.

Objects and advantages other than those mentioned above will become apparent from the following description when read in connection with the drawing.

DESCRIPTION OF THE DRAWINGS

FIGS. 3a-3c illustrate screens which are employed by the users in calendaring an event.

FIGS. 4a and 4b are screens presented to the calendar owner to assist in defining criteria to be used by the system in selecting calendar entries during the view select function.

BRIEF DESCRIPTION OF THE PREFERRED EMBODIMENT

Figure 1:
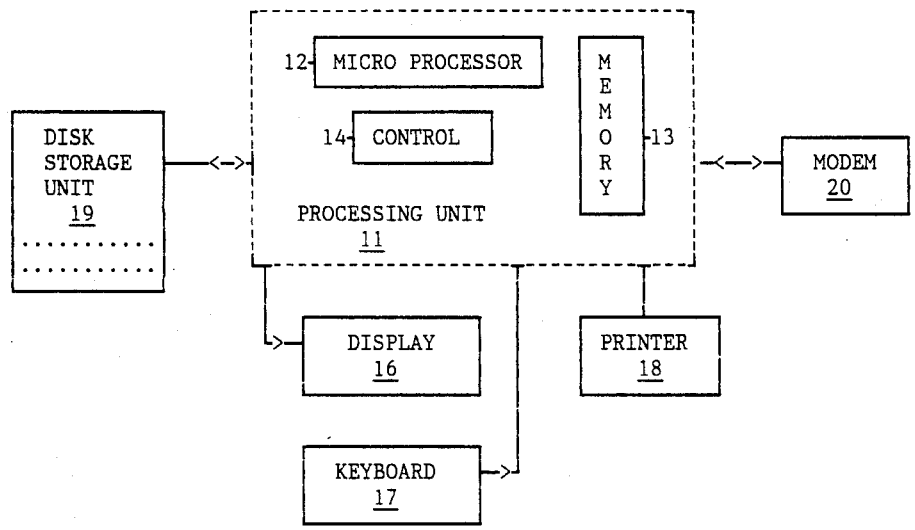
FIG. 1 illustrates an interactive workstation in which the method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro-processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
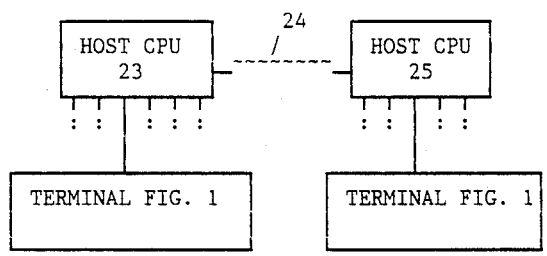
FIG. 2 illustrates a network of interactive workstations of the type shown in FIG. 1.

FIG. 2 illustrates a network 21 of interactive type workstations of the type shown in FIG. 1. As illustrated, the network includes a plurality of terminals which are interconnected with each other and to a host central processing unit 23, which in turn is connected via communication link 24 to a second host processing unit 25, which also connects to another network 26 of interactive workstations. Functionally, the system operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listing of individual calendar owners and shareable resources such as meeting rooms, etc., which require scheduling.

The system shown in FIG. 2 processes information as various types of data objects such as text data objects, graphic data objects, and calendar data objects. Each of these data objects are represented by a datastream which comprises a series of structured fields.

A calendar object datastream has the following sequence of structures.

---

Begin Document (BDT)
  Begin Page (BPG)
    Begin Calendar Data (BCL)
      Calendar Data Descriptor (CDD) (Optional)
      Calendar Data SF (CAD)
        Calendar Structures (COCA)
    End Calendar Data (ECL)
  End Page (EPG)
End Document (EDT)

---

The format of the datastream for other type data objects contain the begin document, begin page, end page, and end document data structures. Structured fields corresponding to those listed above for a calendar object are also employed for other type objects.

A structured field is a self-describing entity which contains related groupings of parameter values and triplets. The structure field, as shown below, has two parts: the Structured Field Introducer and the Structured Field Content.

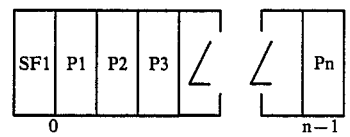

The structured field begins with a Structured Field Introducer. The syntax and semantics of the Structured Field Introducer are defined by the architecture which governs the datastream in which the structured field is found. The Structured Field Introducer contains as the first two bytes a parameter which defines the length of the structured field. It also contains an identification code which uniquely identifies the structured field.

The Structure Content portion of each structured field contains structures and triplets, which give the structured field its meaning. Parameters in the triplets define the attributes of the Calendar Object. Every parameter has a value either explicitly appearing in a triplet, inherited from a control structure in the datastream's hierarchy, or implicitly defined as a default. This default may also be the alternate action value.

Every structure is either required or optional. A required structure appears in the object because the function of that structure is required and for proper performance of the function an value is necessary.

An optional structure need not appear in the object either because the function of that structure is not required or because the function is required, but default values are acceptable for all parameters.

As shown above, a calendar data (CAD) structured field (SF) precedes the actual calendar data. A calendar data descriptor (CDD) SF can precede the CAD SF to provide formatting information for the data that follows.

Calendar data comprises named data structures and named triplets which are composed of parameters. A parameter is a variable to which a value is assigned. Parameters can be optional or required. Parameters are also classified as terminal or non-terminal. A terminal parameter is merely the last parameter in a string of parameters.

A parameter can have one of three types of values assigned.
1. NUM—This is a number or a numerical value.
2. COD—This is a code assigned a specific meaning.
3. BST—This is a bit string of binary elements, each of which is usually independent of the other.

In the following discussion it will be assumed that a byte comprises 8 bit positions numbered 0-7 from left to right, with position 0 being the high order position. Bit position 0 represents $2^{}7$ (2 to the 7th power), while bit 7 represents $2^{}0$ (2 to the 0 power).

The various calender structured fields and calendar triplets are defined by the following type of table.

| BYTES | NAME | TYPE | MIN | MAX | LGTH | OPT |
|-------|------|------|-----|-----|------|-----|
| n-m   | name | type | v   | x   | www  |     |

In the figure:
BYTES refers to the position, indexed on zero.

NAME is the name by which reference is made to the parameter.
TYPE denotes the syntax of the parameter by "type,"
The architected types NUM, COD, and BST were described earlier.
LGTH denotes the length of the field in terms of the exact number of bytes or the maximum number of bytes permitted.
OPT refers to the optionality of the parameter's appearance in the structure or triplet:
 O means that the parameter is optional.
 R means that the parameter's appearance is required.
If a required parameter is missing, an exception condition exist. The alternate action is to ignore the structure, self-defining field, or triplet to which the missing parameter belongs.

Syntactically descriptive material below the figure indicates what additional restrictions apply to the structure or triplet defined by the figure.

Calendar structures and calendar triplets which are relevant to the present invention will be described using the above-described format. After the structures are described, the display screens that are presented to calendar owners by the system in order to solicit information when a calendar owner wants to perform a calendaring function will be described. A flow chart setting forth the detailed steps of the method of the present invention will then be described in connection with the program listing of pseudocode that will assist persons skilled in programming interactive terminals to implement the method of the present invention.

Since the view select function operates to select the subset of calendar entries from one or more calendars, it is necessary to describe in detail the data structures that are employed by the system in the process of an owner calendaring an event on his calendar. In the preferred embodiment, calendar entries are classified into a number of different types. Since the system contemplates interchanging calendar data throughout the system, including terminals that are remotely connected, such as those shown in FIG. 2, entry types and presentation language are controlled by a defined architecture. While the same display screen may be employed to solicit the data for a number of different event types, the data structures and triplets, required or optional, will vary by event type.

While some of the structures to be described and the triplets associated with these structures are not directly involved in the view select function, they have been described in order to provide background for the reader and a basis for a comprehensive understanding of the claimed process and its relationship to the processes described and claimed in the cross-referenced application.

The various calendar object data structures to be described are preceded by a calendar data structure shown below.

| | CALENDAR DATA (CAD) STRUCTURE FIELD (SF) | | | | | |
|---|---|---|---|---|---|---|
| BYTES | NAME | TYPE | MIN | MAX | LGTH | OPT |
| 0-1 | Structured Field Length | NUM | 8 | 32767 | 2 | R |
| 2 | Structured Field Type1 | COD | X'D3' | X'D3' | 1 | R |
| 3 | Structured Field Type2 | COD | X'EE' | X'EE' | 1 | R |
| 4 | Structured Field Type3 | COD | X'5B' | X'5B' | 1 | R |
| 5 | Flags | BST | 0 | 0 | 1 | R |
| 6-7 | Segment Sequence Number | NUM | 0 | 32767 | 2 | R |
| 8-7+n | Calendar Data | | * | * | n | R |

*Values depend on the Calendar Object structure and triplet specification.

The calendar Data SF (CAD) identifies the data as calendar data and specifies the length of the calendar data. The calendar Data SF contains, for example, up to 32767 bytes of calendar structures and calendar triplets (called "Calendar Data"). Calendar data varies with the function employed by the generator of the object.

MAJOR CALENDAR STRUCTURES DESCRIPTION

This section describes the major structures that are involved in the present invention. The structures consist of a mixture of calendar triplets. The triplets are described in the Calendar Triplets Description section that follows this section.

The calendar structures are preceded by the Calendar Data structured field (CAD). Parameter values specified by the system can be overridden by parameters specified in calendar data. For example, the Code Page of Symbols for Displaying and Printing Data.

In the structure description, bits are consecutively numbered from left to right starting with zero.

The format for all of the structures is the same. The format is shown below.

| BYTES | NAME | TYPE | MIN | MAX | LGTH | OPT |
|---|---|---|---|---|---|---|
| 0-1 | LENGTH | NUM | | | | R |
| 2-3 | TYPE | COD | | | | R |
| 4-n | TRPLT1 to TRPLTn | | | | | R | where

LENGTH = A two-byte value of the number of bytes in this structure including byte zero.

TYPE = A two-byte binary number that designates a specific structure function.

TRPLT1 TO TRPLTn = Calendar Structure Triplets.

The length of structures can vary depending on the number of triplets included.

If the length excludes all or part of an optional parameter in a triplet, then the value for that parameter and any parameters that follow are not changed; that is, the LENGTH field is used as specified.

If a structure is invalid or unsupported, an exception is raised. If the length field excludes a required parameter or triplet, an exception is raised. If a structure contains an invalid or unsupported parameter or triplet, an exception is raised.

MEETING (MTG) STRUCTURE

The meeting structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'85' | X'85' | 1 | R |
| 4-3+n | Meeting Triplets | | * | | n | R |

*Values depend on the triplet specification.

The MTG structure provides the fields necessary to interchange meeting information, the scheduling of meetings and requests for meeting information. It also provides a specific search classification to allow building a composite calendar for a specified list of calendar owners.

The Valid MTG Triplets are listed below and defined in detail in the following section.

ERROR ACTION (EAC)—An EAC triplet may occur in any sequence and is optional.

STRUCTURE ID (SID)—The SID specifies the ID for the meeting. optional SID may be included to identify a Trigger (TRG) associated with the meeting.

DATE AND TIME (DTT)—The DTT triplet provides the meeting time(s) and date(s) and is required. DTT triplets must occur in ascending time(s) and date(s). A meeting that occurs at non-sequential times can be scheduled by using more than one DTT triplet specifying the required times.

NAME (NME)—Network Address (NAD), Postal Addresses (PAD) and User Status (UST) triplets may be used to provide user status and addresses for a named item. NME triplets and associated NAD, PAD and UST triplets may be included for both the CALLER (meeting owner) and the ARRANGER (meeting arranger). The Name Status byte specifies whether or not NAD, PAD and UST triplets follow the Name triplet which is optional.

USER STATUS (UST)—The UST triplet provides the role and status for the person named in the NME triplet. This triplet is only valid when it follows a NME triplet and is optional.

NETWORK ADDRESS (NAD)—The NAD triplet provides the network address for the person named in the NME triplet and is optional.

POSTAL ADDRESS (PAD)—The PAD triplet provides the the mailing address for the person named in the NME triplet and is optional.

EVENT STATUS (EVS)—The EVS specifies the meeting status and is optional.

TIME STAMP (TMS)—Only one TMS triplet is allowed in the MTG structure and it is optional.

ENTRY SECURITY (ESL)—If this control is omitted the security level is PUBLIC. Only one ESL triplet is allowed in the MTG structure and it is optional.

SET CODED GRAPHIC CHARACTER SET GLOBAL ID (SCG)—The SCG selects the character set and code page for characters contained in the triplets that follow the SCG in the calendart structure. The Network Address character set and code page are not affected by the SCG. The active code page is restored automatically at the end of the calendar structure.

SUBJECT (SBJ)—The SBJ triplet contains character data describing the meeting subject. One SBJ triplet is allowed in each MTG structure and it is optional.

PLACE (PLC)—The PLC triplet contains character data describing the meeting location. One PLC triplet is allowed in each MTG structure and is optional.

DETAIL (DTL)—The DTL triplet contains character data describing the meeting. If the Code Page or character Set is changed in the meeting description, the DTL triplet must be ended, a SCG triple inserted, and another DTL triplet built. It is optional.

RSVP (RVP)—The RVP specifies the need for an attendance response from the meeting invitee and it is optional.

If a MTG structure is received without all required triplets, an exception exists. The default action is to skip the structure and continue processing. If a MTG structure contains an unsupported or invalid triplet, an exception exists. The default action is to skip the triplet and continue processing. If a MTG structure contains a DTT triplet with dates and times not in ascending order or if the optional SCG triplet occurs at a position that does not immediately precede a triple with text data (DTL, SBJ, PLC), an exception exists. The default action, in both cases, is to ignore the triplet and continue processing.

NAMES LIST (NML) DATA STRUCTURE

The names list data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'8A' | X'8A' | 1 | R |
| 4-3+n | NML Triplets | | * | * | n | R |

*Values depend on the triplet specification.

The NML structure provides the fields to support a name, associated addresses and status. The NML may contain a list of items, such as an invitees list, by concatenating Name (NME), Address (ADR) and User Status (UST) sequences. The list may include one or more than one name and associated information.

The following Valid NML Triplets for the NML DS were described in connection with the MTG structure. ERROR ACTION, STRUCTURE ID, TIME STAMP, ENTRY SECURITY, SET CGCSGID, NAME, USER STATUS, NETWORK ADDRESS and POSTAL ADDRESS.

The Date and Time (DTT) triplet is not valid. The following triplet, however, is optional for the Names List data structure.

NAMES LIST TYPE (NLT)—Only one NLT triplet is allowed in the Names List structure. The NLT triplet specifies the type of data contained in the Names List. If the NLT is not specified, the list contains a list of names and or status and/or addresses that are not necessarily in one of the categories defined by the NLT triplet.

If an NML structure is received without a Structure ID triplet, an exception exists. The default action is to skip the structure and continue processing. If an NML structure contains an unsupported or invalid triplet, and exception exists. The default action is to skip the triplet and continue processing. Each sequence of the Names List structure triplets must occur in the listed order. Optional triplets may be omitted from any sequence. If a NML structure is received with a triplet out of sequence, an exception exists. The default action is to skip the structure and continue processing. The above-described processing for handling exceptions is standard for most structures and therefore can be assumed for the following items.

VIEW SELECT (VSL) DATA STRUCTURE

The View Select data structure is shown below.

| BYTES | NAME | TYPE | MIN | MAX | LGTH | OPT |
| --- | --- | --- | --- | --- | --- | --- |
| 0-1 | Structure Length | NUM | * | 32767 | 2 | R |
| 2 | Structure Type1 | COD | X'D3' | X'D3' | 1 | R |
| 3 | Structure Type2 | COD | X'95' | X'95' | 1 | R |
| 4-3+n | VSL Triplets | | * | * | n | R |

*Values depend on the triplet specification.

The VSL structure provides a way to request calendar views for specific category(s) and timespan(s).

The Valid VSL Triplets previously described include the ERROR ACTION (EAC), USER DEFINED FIELD (UDF) and DATE and TIME (DTT) triplets.

The following triplet is also optional and valid.

ENTRY CATEGORY (ECT)—The ECT selects the category(s) for the calendar entry(s) to be selected in the view request. Only one ECT is allowed in a View Select structure. When more than one category is selected in the ECT, the view returned will contain the selected categories. If both the ECT and UDF triplet are omitted, all entries in the selected timespan will be returned.

The DTT triplet dates and times must occur in ascending order. The first DTT processed must provide the earliest date and time block. The last DTT processed must provide the latest date and time block. The first DTT also provides the begin date and time for the timespan selected.

When the optional ECT triplet is present, the VSL triplets must occur in the order ECT, DTT.

CALENDAR TRIPLETS DETAIL DESCRIPTION

This section describes in detail the set of calendar triplets that are the building blocks designed to be used by the Calendar Structures of the system including those described in the previous section.

The previous section indicated where these triplets are valid.

The triplets are described in alphabetic order.

In the triplet descriptions, bits are consecutively numbered from left to right starting with zero.

The format for all of the triplets is the same and is shown below.

| BYTES | NAME | TYPE | MIN | MAX | LGTH | OPT |
| --- | --- | --- | --- | --- | --- | --- |
| 0 | LENGTH | NUM | | | | R |
| 1 | KEYWORD | COD | | | | R |
| 2-n | PARM1 to PARMn | | | | | R | where

LENGTH=A one-byte value of the number of bytes in this triplet including byte zero.

KEYWORD=a one-byte binary number that designates a specific triplet function.

PARM1 to PARMn=Parameters containing the triplet settings.

The length of some triplets can vary depending on the number of parameters specified. If the length excludes an optional parameter or part of an optional parameter, then the value for that parameter and any parameters that follow are not changed; that is, the LENGTH field is used as specified. If a triplet is received in which the length exceeds the maximum value required to include all parameters, an exception is raised since the additional values are considered to be unsupported parameters. Also, if the length field excludes a required parameter, an exception is raised.

Since bytes 1 and 2 of all the triplets are identical, they are not shown for each triplet. Only bytes 2 through n will be described.

NETWORK ADDRESS (NAD) TRIPLET DATA STRUCTURE

The NAD triplet data structure is shown below.

| BYTES | NAME | TYPE | MIN | MAX | LGTH | OPT |
| --- | --- | --- | --- | --- | --- | --- |
| 2-n | Network Address | COD | * | * | 16 | 0 |

The NAD triplet provides the Network Address for the item named in the (NME) triplet.

The NAD Parameters include,

NETWORK ADDRESS—This is the person's Network Address.

Bytes 2 through 9=USER ID

BYTES 10 through 17=NODE ID

POSTAL ADDRESS (PAD) TRIPLET DATA STRUCTURE

The PAD triplet data structure is shown below.

| BYTES | NAME | TYPE | MIN | MAX | LGTH | OPT |
|---|---|---|---|---|---|---|
| 2-n | Postal Address | COD | * | * | 1-253 | 0 |

The PAD triplet provides the Postal Address for the item named in the (NME) triplet.
The PAD Parameters include,
POSTAL ADDRESS—This is the person's Postal Address. Valid values are valid characters in the active or selected code page.

PROCESS ID (PRD) TRIPLET DATA STRUCTURE

The PRD triplet data structure is shown below.

| BYTES | NAME | TYPE | MIN | MAX | LGTH | OPT |
|---|---|---|---|---|---|---|
| 2-n | Process | COD | * | * | 1-16 | 0 |

The PRD triplet specifies the ID of a process such as a computer program.
The PRD Parameters include,
PROCESS -A 1 to 16 byte identifier. Valid values are valid characters in the active or selected code page.

DATE AND TIME (DTT) TRIPLET DATA STRUCTURES

The DTT is shown below.

| BYTES | NAME | TYPE | MIN | MAX | LGTH | OPT |
|---|---|---|---|---|---|---|
| 2 | Daylight Saving Indicator | NUM | 0 | 1 | 1 | R |
| 3 | Time Zone Indicator | NUM | −23 | 23 | 1 | R |
| 4-5 | Begin Data Day | NUM | 1 | 366 | 2 | R |
| 6-7 | Begin Date Year | NUM | −32K | 32767 | 2 | R |
| 8-9 | Begin Time | NUM | 0 | 86400 | 3 | R |
| 11-12 | End Date Day | NUM | 1 | 366 | 2 | 0 |
| 13-14 | End Date Year | NUM | −32K | 32767 | 2 | 0 |
| 15-17 | End Time | NUM | 0 | 86400 | 3 | 0 |
| 18-254 | Additional Date/Time Combinations | | | | | |

The DTT triplet specifies the dates and times for the associated triplets in the calendar structure.

DTT Parameters

DAYLIGHT SAVINGS INDICATOR—Specifies Daylight Savings Time is active. This parameter, in conjuction with the Time Zone, identifies the time zone and allows the correct time zone label (i.e., CST or CDT) to be applied to the time.
TIME ZONE INDICATOR—The Time Zone Indicator is the displacement from Greenwich Mean Time (GMT) for the time specified. Values are specified in half hours from GMT to handle half-hour zones.
BEGIN DATE DAY—The day of the year when the event begins.
BEGIN DATE YEAR—The year the event begins.
BEGIN TIME—Begin Time specifies the event start time in seconds.
END DATE DAY—The day of the year when the event ends.
END DATE YEAR—The year the event ends.
END TIME—End Time specifies the event stop time in seconds.

Date is specified as a combination of two, two byte parameters (day of the year and year). Time is local time in seconds beginning at midnight. One Begin Date and Begin Time is required in each DTT triplet. The Begin and End, Date and Time sequence may be repeated if additional begin and end date and begin and end times are needed.

If more dates and times then can be sent in one DTT triplet are needed, additional DTT triplets can be included in the Calendar Structure. The only restriction is the byte structure length.

DETAIL (DTL) DATA STRUCTURE

The DTL DS is as follows.

| BYTES | NAME | TYPE | MIN | MAX | LGTH | OPT |
|---|---|---|---|---|---|---|
| 2-1+n | Character String | COD | * | * | n | R |

The DTL triplet contains character data in the active or selected code page.

DTL Parameters

CHARACTER STRING—Text information associated with a calendar entry. Values are valid characters in the active or selected code page.
If the CGCSGID (SCG) is changed in a character string, the DTL triplet must be ended and another one built after inserting the SCG.

ENTRY CATEGORY (ECT) DATA STRUCTURE

The ECT DS is shown below.

| BYTES | NAME | TYPE | MIN | MAX | LGTH | OPT |
|---|---|---|---|---|---|---|
| 2-5 | Category | BST | | | 4 | R |

The ECT triplet provides a specific category for unavailable time and for open time on a calendar. The ECT triplet is used to specify calendar entry category(s) in requests and replies for both the Date and Time Map (DTM) and the View Select (VSL) structures.

ECT Parameter

CATEGORY—A four byte, bit encoded value. Combinations of more than one category bit are allowed. The categories provide both request and response categories for both Date and Time Map (DTM) and View Select (VSL) calendar structures. Bits 0 through 20 may be used for both DTM and VSL categories. Bits 21 through 24 are used in View Select only. If they are used in a Date and Time Map, they are ignored.

BIT SIGNIFICANCE ENCODING

0=Holiday (General)—The owner will work on this holiday.
1=Holiday (Confirmed)—A confirmed calendar owner holiday.

2=Holiday (Tentative)—A tentative calendar owner holiday.
3=Vacation (Confirmed)—Confirmed calendar owner vacation.
4=Vacation (Tentative)—Tentative calendar owner vacation.
5=Offsite (Confirmed)—The calendar owner will not be at the normal work location and will not be available.
6=Offsite (Tentative)—The calendar owner has tentatively scheduled an activity away from the normal work location.
7=Not Normal Work Hours—Categorizes hours that are not normally worked.
8=Confirmed Meetings (Not Attended)—The calendar owner will not attend.
9=Confirmed Meetings (Attended)—The calendar owner will attend.
10=Confirmed Meetings (May Attend)—The calenders owner's status for this meeting is tentative.
11=Tentative Meetings (Not Attended)—The calendar owner will not attend.
12=Tentative Meetings (Attended)—The calendar owner will attend this meeting if it becomes confirmed.
13=Tentative Meetings (May Attend)—The calendar owner's status for this meeting is tentative.
14=Confirmed Appointments (Not Attended)—The calendar owner will not attend.
15=Confirmed Appointments (Attended)—The calendar owner will attend.
16=Confirmed Appointments (May Attend)—The calendar owner's status for this appointment is tentative.
17=Tentative Appointments (Not Attended)—The calendar owner will not attend.
18=Tentative Appointments (Attended)—The calendar owner will attend this appointment if it becomes confirmed.
19=Tentative Appointments (May Attend)—The calendar owner's status for this appointment is tentative.
20=Non-Scheduled Time—Identifies open time on the calendar. This category is most effective if used alone.
21=Date and Time Only (VIEW SELECT ONLY)—Selects date and time for all categories not specifically requested in a View Select.
22=Private Entry (VIEW SELECT ONLY)—Only date and time may be provided in the response to a calendar View Select request.
23=Calendar Comments (VIEW SELECT ONLY)—Character data entries.
24=Triggers (VIEW SELECT ONLY)—Entries that start a process and/or notify.
25-31=Reserved If all category bits are set to one in a request for a Date and Time Map, the information returned is meaningless because it includes both scheduled and non-scheduled time. The "Non-Scheduled Time" bit should be used carefully if is used with other bits to obtain meaningful data. The "Not Normal Work Hours" bit should also be used carefully for similar reasons.

ENTRY CLASSIFICATION (ENC) DATA STRUCTURES

The ENC DS is as follows

| BYTES | NAME | TYPE | MIN | MAX | LGTH | OPT |
|---|---|---|---|---|---|---|
| 2-3 | Classification | BST | | | 2 | R |

The ENC triplet provides a specific Classification code for a calendar entry that occupies a block of time.

ENC Parameters

CLASSIFICATION—A two byte bit encoded value. Combinations of more than one Classification Bit are not allowed.

BIT SIGNIFICANCE ENCODING

0=Holiday—(General) NThge owaner will work on this holiday.
1=Holiday—(Confirmed) A confirmed calendar owner hoilday.
2=Holiday—(Tentative) A tentative calendar owner holiday.
3=Vacation—(Conmfirmed) Confirmed calendar owner vacation.
4=Vacation—(Tentative) Tentative calendar owner vacation.
5=Offsite—(Confirmed) The calendar owner will not be at the normal work location and will not be unavailable.
6=Offsite—(Tentative) The calendar owner has tentatively scheduled an activity away form the normal work location.
7=Not Normal Work Hours—Identifies times that the calendar owner is normally not at work.

ERROR ACTION (EAC) DATA STRUCTURE

The EAC DS is as follows

| BYTES | NAME | TYPE | MIN | MAX | LGTH | OPT |
|---|---|---|---|---|---|---|
| 2 | Action | BST | | | 1 | R |

The EAC triplet specifies the action required when an exception is processed.

EAC Parameter

ACTION—The error action specification.

BIT

0=0—(DEFAULT) Report the exception, take a default action and continue.
0=1—Ignore the exception, take a default action and continue.

An EAC triplet may occur at any place in a calendar structure. If an error action is not specified, the default is to report the error, take a default action and continue.

The Error Action specified in a calendar structure remains active only until the structure end, at which time, the default Error Action becomes active.

EVENT STATUS (EVS) DATA STRUCTURE

The EVS DS is as follows.

| BYTES | NAME | TYPE | MIN | MAX | LGTH | OPT |
|---|---|---|---|---|---|---|
| 2 | Event Status | BST | | | 1 | R |

The EVS triplet provides status for an event such as an appointment or meeting.

EVS Parameter

EVENT STATUS—The status of an event

BIT SIGNIFICANT ENCODING

0=Confirmed (the meeting time has been established)
1=Tentative (the meeting is tentative)
2=Cancelled (the meeting was cancelled)
3=Postponed (the new date and time are not set)
4=Rescheduled (the meeting hs been rescheduled)
5=Market for Archive (entry will be saved for reference)

NAME (NME) DATA STRUCTURE

The NME DS is as follows.

| BYTES | NAME | TYPE | MIN | MAX | LGTH | OPT |
|---|---|---|---|---|---|---|
| 2 | Name Type | BST | | | 1 | R |
| 3 | Associated Triplets | BST | * | * | 1 | R |
| 4-n | Item Name | COD | * | * | 1-251 | R |

The NME triplet specifies a name of either a person or a calendar.

NME Parameters

NAME TYPE—Specifies the name type. Bits 1 and 2 are mutually exclusive. Only one of these bits may be set to 1. both a User Status (UST) and an Address (ADR) triplet may follow the NME triplet in any order. Either the UST or the ADR may occur first. When specified present, the UST and/or the ADR must be processed before another triplet is encountered.

BIT SIGNIFICANCE ENCODING

0=(0—Name is a personal name). (1—Name is a calendar name).
1=1—Name is a primitive name not unique in a network
2=1—Name is a descriptive name unique in a network).
3-7=Reserved ASSOCIATED TRIPLETS—Bits set to 1 specific that User Status (UST), Network Address (NAD) and Postal Address (PAD) triplets may follow the NME triplet in any order.

0=User Status (UST) triplet follows that specifies named items role and status.
1=An Network Address (NAD) triplet follows that specifies the named item's network address(es).
2=A Postal Address (PAD) triplet follows that specifies the name item's postal address (s)

ITEM NAME—Specifies the name of a person or calendar. Values are valid characters in the active or selected code page. The maximum name size is 251 bytes.

The item named the NME triplet may be further identified using the User Status (UST), the Postal Address (PAD) and the Network Address (NAD) triplets.

The NME triplet must be preceded with an SCG triplet if the characters used are not on the active code page.

NAMES LIST TYPE (NLT) DATA STRUCTURE

The NLT DS is as follows.

| BYTES | NAME | TYPE | MIN | MAX | LGTH | OPT |
|---|---|---|---|---|---|---|
| 2-3 | List Type | BST | | | 2 | R |

The NLT triplet specifies the type of data contained in a list.

NLT Parameter

LIST TYPE—Specifies the list type. Combinations of bits are allowed.

BIT SIGNIFICANCE ENCODING

2=1 Name is a Nickname associated with a Network Address.
2-15 Reserved

The list may optionally contain postal addresses and user status. The NLT triplet describes the list contents for specific list types. Lists containing the NLT are constrained to the specified contents. If the NLT is omitted the lists may contain any valid combination of names, user status and addresses.

PLACE (PLC) DATA STRUCTURE

The PLC DS is as follows:

| BYTES | NAME | TYPE | MIN | MAX | LGTH | OPT |
|---|---|---|---|---|---|---|
| 2-n | Location | COD | * | * | 1-253 | R |

The PLC triplet specifies a location for an event such as a meeting or appointment. The location is described using text characters. The maximum location length is limited to 253 text bytes.

PLC Parameters

LOCATION—Location specifies the event location.

RSVP (RVP) DATA STRUCTURE

The RVP DS is as follows:

| BYTES | NAME | TYPE | MIN | MAX | LGTH | OPT |
|---|---|---|---|---|---|---|
| 2 | RSVP | BST | | | 1 | R |

The RVP triplet indicates that an attendance response is required.

RVP Parameter

RSVP—Specifies the need for a response to a meeting schedule request.

BIT SIGNIFICANCE ENCODING

0=No attendance response is required.
1=An attendance response is required using the NML structure.

SET CODED GRAPHIC CHARACTER SET GLOBAL ID (SCG) DAT STRUCTURE

The SCG DS is as follows:

| BYTES | NAME | TYPE | MIN | MAX | LGTH | OPT |
|---|---|---|---|---|---|---|
| 2-3 | GCSGID | NUM | 1 | 65534 | 2 | R |
| 4-5 | CPGID | NUM | 1 | 65534 | 2 | R |

The SCG triplet specifies the coded graphic character set global identification that is used to map subsequent text into presentable graphics.

The CGCSGID that is specified by the system selects the active Character Set and Code Page. If the CGCSGID is not specified the default Character Set and Code Page specified are used.

SCG Parameters

CGCSGID—Coded Graphic Character Set Global ID; a concatenation of 2 two-byte numbers. The first two bytes identify the Graphic Character Set Global ID (GCSGID) expressed as a binary value. The second two bytes identify the Code Page Global ID (CPGID) expressed as a binary value.

GCSGID—Graphic Character Set Global ID.
CPGID—Code Page Global ID.

GCSGID and CPGID are used to determine how coded text characters are translated to the graphic characters to be presented.

The SCG will only select a code page for the triplet that immediately follows it. If structures containing text characters on a code page that is different from the default code page are concatenated, a separate SCG is required preceding each structure.

The SCG has no affect on the NETWORK ADDRESS in the UDF triplet and the USER CODE in the UDF triplet.

STRUCTURE ID (SID) DATA STRUCTURE

The SID DS is as follows:

| BYTES | NAME       | TYPE | MIN | MAX | LGTH | OPT |
|-------|------------|------|-----|-----|------|-----|
| 2     | ID Type    | BST  |     |     | 1    | R   |
| 3-n   | Identifier | COD  | *   | *   | n    | R   |

The SID triplet provides an identifier for calendar structures.

SID Parameters

ID TYPE—Specifies the ID type

BIT SIGNIFICANCE ENCODING

0=Entry ID—Identifies a calendar entry
1=Names List ID—Identifies a list of names
2=Trigger ID=Identifies a trigger
3=Profile ID—Identifies a calendar profile
 IDENTIFIER—1 to 44 character identifier.

The SID provides a correlation ID to accomplish calendar updates from an intelligent workstation to a host, to correlate responses to a meeting notice with the meeting names list and to correlate notification of a list of people associated with a meeting or a list.

SUBJECT (SBJ) DATA STRUCTURE

The SBJ DS is as follows:

| BYTES | NAME          | TYPE | MIN | MAX | LGTH  | OPT |
|-------|---------------|------|-----|-----|-------|-----|
| 2-n   | Event Subject | COD  | *   | *   | 1-253 | R   |

The SBJ triplet specifies the subject for an event. The subject is described using text character.

SBJ Parameters

EVENT SUBJECT—This parameter specifies the event subject.

TIME STAMP (TMS) DATA STRUCTURE

The TMS DS is as follows.

| BYTES | NAME                      | TYPE | MIN  | MAX   | LGTH | OPT |
|-------|---------------------------|------|------|-------|------|-----|
| 2     | Daylight Savings Indicator | NUM  | 0    | 1     | 1    | R   |
| 3     | Time Zone Indicator       | NUM  | −23  | 23    | 1    | R   |
| 4-5   | Begin Date Day            | NUM  | 1    | 366   | 2    | R   |
| 6-7   | Begin Date Year           | NUM  | −32K | 32767 | 2    | R   |
| 8-10  | Begin Time                | NUM  | 0    | 86400 | 3    | R   |
| 11    | Network Address Length    | NUM  | 0    | 128   | 1    | 0   |
| 12-n  | Network Address           | COD  |      |       | 128  | 0   |

The TMS triplet specifies an entry's creation date and time in local time.

TMS Parameters

DAYLIGHT SAVING INDICATOR—Specifies Daylight Saving Time is active. This parameter, in conjunction with the Time Zone, identifies the time zone and allows the correct time zone label (i.e.,. CST ot CDT) to be applied to the time.

TIME ZONE INDICATOR—The Time Zone Indicator is the displacement from Greenwich Mean Time (GMT) for the time specified. Value are specified in half hours from GMT to handle half hour zones.

BEGIN DATE YEAR—The year the event begins.
BEGIN TIME—Begin Time Specifies the event start time.
NETWORK ADDRESS—System address
  Bytes 11 thru 18=USER ID—valid characters in CP256, CS930.
  Bytes 19 thru 26=NODE ID—valid characters in CP256, CS930.
  RESERVED—This field is reserved to support a four byte Network address.

USER DEFINED FIELD (UDF) DATA STRUCTURE

The UDF DS is as follows:

| BYTES | NAME      | TYPE | MIN | MAX | LGTH | OPT |
|-------|-----------|------|-----|-----|------|-----|
| 2     | Priority  | NUM  | 1   | 10  | 1    | R   |
| 2-9   | User Code | COD  | *   | *   | 1-8  | R   |

The UDF triplet provides a priority and user defined field that is assigned by the calendar owner. The assigned code provides additional entry categories.

UDF Parameters

PRIORITY—A one byte field that specifies a priority value for a calendar entry. 1is the highest and 10 is the lowest priority.

USER CODE—An eight byte user defined code.

USER STATUS (UST) DATA STRUCTURE

The UST DS is as follows:

| BYTES | NAME | TYPE | MIN | MAX | LGTH | OPT |
|---|---|---|---|---|---|---|
| 2 | Role | COD | 0 | 7 | 1 | R |
| 3 | Personal Status | COD | 0 | 5 | 1 | R |

The UST triplet provides information regarding the person named in the Name (NME) triplet. It provides the named persons Role and Personal Status.

UST Parameters

ROLE—Specifies the persons role regarding the event.

VALUES

0=Caller—Person has called the event.
1=Arranger—Person is arranging the event.
2=Invitee (Default)—Person has been invited to the event.
3=Mandatory Invitee—Person who must attend the meeting.
4=Alternate—Person replacing an invitee for attendance consideration.
5=Additional attendee—Person who is adding themselves to the distribution list associated with a grup meetting.
6=Receives Copy—Person who receives event information.
7=Receives Blind Copy—Person who receives event informtion only, whose name woll not appear on the distribution list.

PERSONAL STATUS—The status associated with the name.

VALUES

0=No Action (no status has been received)
1=Confirmed (the person will attend)
2=Tentative (the person might attend)
3=Not Attending (the person will not attend)
4=User Acknowledge (received the invitation)
5=Alternate (the invitee will not attend, but an alternate may)

WORK TIMES (WTM) DATA STRUCTURE

The WTM DS is as follows:

| BYTES | NAME | TYPE | MIN | MAX | LGTH | OPT |
|---|---|---|---|---|---|---|
| 2 | Daylight Savings Indicator | NUM | 0 | 1 | 1 | R |
| 3 | Time Zone Indicator | NUM | −23 | 23 | 1 | R |
| 4-6 | Begin Time | NUM | 0 | 86400 | 3 | R |
| 7-9 | End Time | NUM | 0 | 86400 | 3 | R |
| 10-254 | Additional Begin/End Time Combinations | | | | | |

The WTM triplet specifies the work times for an associated calendar. Time is local time in seconds beginning at midnight.

WTM Parameters

DAYLIGHT SAVING INDICATOR—Specifies Daylight Savings Time is active. This parameter, in conjunction with the Time Zone, identifies the time zone and allows the correct time zone label (i.e., CTS or CDT) to be applied to the time.

TIME ZONE INDICATOR—The Time Zone Indicator is the displacement from Greenwich Mean Time (GMT) for the time specified. Values are specified in half hours from GTM to handle half hour zones.

BEGIN TIME—Begin time specifies the time block begin in seconds.

END TIME—End Time specifies the time block end in seconds.

One Begin time and End Time is required in each WTM triplet. The Begin and End Time sequence may be repeated if additional begin and end times are needed.

THE PROCESS OF CALENDARING AN EVENT

FIG. 3a is a screen that is displayed to the operator/calendar owner in response to the operator indicating to the system that the he wants to calendar an event. Assume that a meeting has been scheduled at 10:00 a.m. on Thursday, Oct. 7, 1986 and that the request for the meeting was not issued through the electronic calendaring system. The owner then enters the following information into the system employing the screens of FIGS. 3b and 3c. To identify the event type after selecting option 1 on screen 3a, the operator merely presses the enter key since the cursor has automatically been positioned at the event, e.g., Meeting on the screen of FIG. 3b. The next entry involves assigning a priority to this event. The value to be entered is from 1-10, as indicated on the line following the blank for the value. The function of the priority number is to establish the relative importance of this event when viewed with regard to other commitments which are either planned or anticipated. This entry of a priority value is optional since the system will establish a default priority for the event according to some predetermined criteria which has been established for all calendar owners or alternately which is a unique default for each specific individual.

The assignment of a priority value to a calendar event either explicitly by the calendar owner or implicitly by the system is a necessary step in the view select process implemented in accordance with the present invention. The function of the priority value will become more apparent as the description progresses.

Other data that the operator must enter includes the dates, start times and end times. Data that is optional would include the official event identifier, the name of the individual who has called the meeting, the subject of the meeting, the place of the meeting, and any details that the calendar owner may care to provide in the detail field.

FIG. 3c is the third screen presented to the calendar owner during the process of entering an event. This screen permits the owner to establish the security level of the calendar entry and his status relative to the event and, if desired, to set a trigger that will, for example, provide an alarm, a predetermined time before the scheduled time in order to notify the owner of the scheduled event. Cross-referenced application Ser. No. 068,039 describes and claims a trigger process that also employs this screen.

It should be understood that a response screen showing the meeting details may be shown to the calendar owner as the result of receiving a request to attend a meeting. In this case the calendar owner would select the proper response.

The process of calendaring other event types is substantially the same as calendaring a meeting type event. Priorities may be assigned to appointments, vacations, holidays, and not normal work-hour type events. The note type calendar entry does not use a priority value.

It should be assumed for the rest of this description that calendars exist for a plurality of calendar owners on the system and that each calendar includes a number of calendared events and that each event has been assigned a priority value, either by the owner or by the system.

It can further be assumed that an individual calendar owner, e.g., a department manager, wants to schedule a meeting involving all 12 members of his department, each of which maintain a calendar on the system shown in FIG. 2. The manager has concluded that the meeting should be held within the next five working days and would last four hours.

Normally, without an electronic calendaring system, the manager has three options. The first option is to designate a time for the meeting and instruct each invitee/department member to adjust their schedules accordingly. This generally has a negative impact on overall productivity. The second option is to attempt to determine if one or more four hour free periods exist that are common to all invitees/department members and then schedule a meeting from one of these time periods. This is the ideal situation but without an electronic calendaring system that can present the mathematical universe of all free periods of the invitees automatically, considerable time and effort are involved on some individual's part in contacting 12 separate individuals and summarizing their calendars within the time span in which the meeting might be held.

What happens in practice quite often is that no single four hour period exists for all invitees, so the manager selects the third option that involves the minimum amount of disruption to as few individuals as possible. This is an expeditious solution to the problem and is based on a limited amount of knowledge on the manager's part. It therefore may not represent the best overall decision from a business standpoint, since no consideration has been given to the relative importance of the other meetings and events of the various parties involved in the decision.

The process of the present invention permits the manager to assign a priority value to his meeting. The view select process of the electronic calendaring method then returns to the manager, the universe of all four hour periods for the invitees which contain no scheduled event (free periods) which contain a scheduled event that has a priority value lower than the value assigned by the manager to the department meeting. On the assumption that the manager has the authority to pre-empt lower priority events and that calendar owners have applied correct priority values, the view select process provides the manager with the opportunity to select a time for the meeting that is ideally optimum when all important factors are considered with little or no effort on his part and no interruption to the department members.

The screen shown in FIG. 3a is presented to the manager in response to his indicating to the system that he wants to calendar an event. The manager selects entry number 2, which is VIEW SELECT, which then provides the screen of FIG. 4a. The manager then enters whatever criteria he cares to employ in the selection process and enters them on the line labeled "VIEW CRITERIA." He next then selects from the classification list, the term "meeting," and under the additional view criteria, can assign a priority value and can also select open time or have the search criteria check user defined fields. The view time span is then entered in the lines labeled "VIEW TIME SPAN" and is defined by the two dates; the start time of the first date and the end time of the last date.

At the completion of screen 4a, screen 4b is presented to the manager to define the composite calendars that will be presented and to designate the name of the list containing the department members whose calendars will be searched for the criteria that has been entered in the previous screen.

The names list field identifies a specific names list which the manager has previously entered into the system and which includes the names and addresses, e.g., the system node locations of each department member.

Other type lists are also included in the system, with their unique names.

The data returned to the manager by the view select process is a composite calendar setting forth a subset of time periods from the calendars of each invitee/department member which have met the search criteria and which represent a universe of common four hour periods across all of the calendars within the time span designated in FIG. 4b.

Figure 5A:
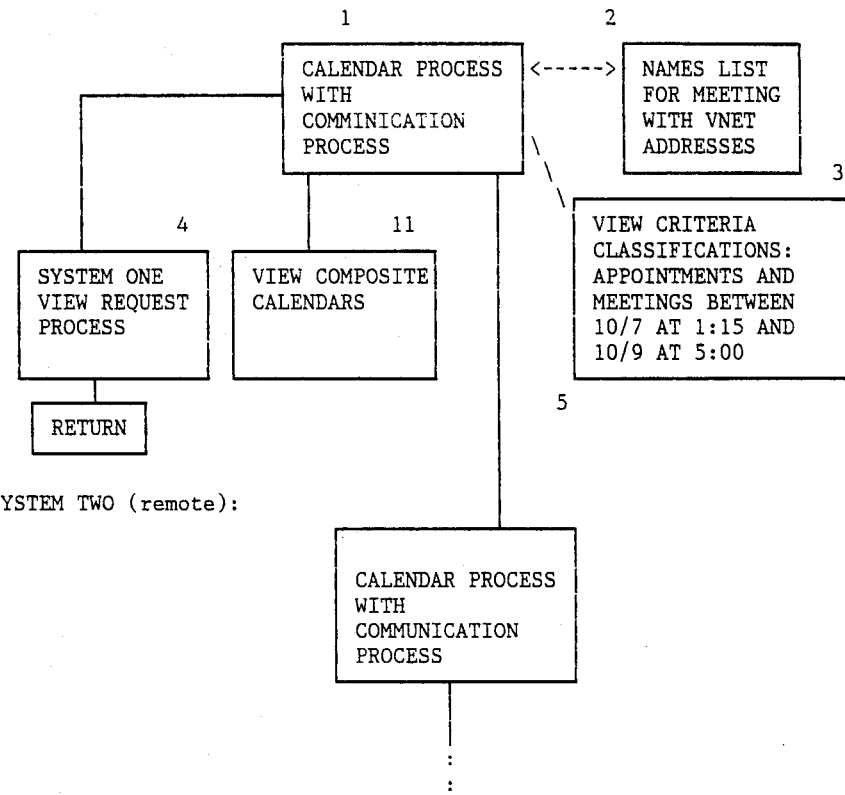
FIGS. 5a and 5b is a flow chart, illustrating the detailed steps of the method of the present invention.
Figure 5B:
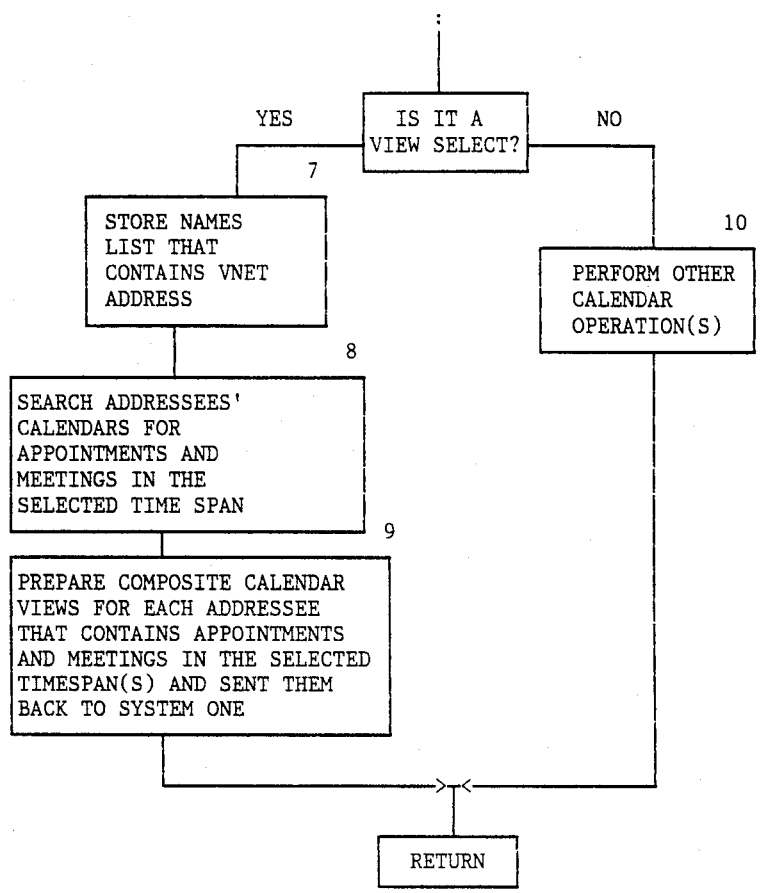

The steps of the view select process are illustrated in the flow chart of FIGS. 5a and 5b. This chart assumes that at least one or more of the invitees is remotely connected to the host system which processes the manager's calendar and the calendars of the other invitees. In the case of the remotely connected invitee, it will be assumed that the system that processes his calendar employs the same calendar architecture that is employed by the manager's system or that a suitable data interchange arrangement exists between the two systems to permit processing calendar objects.

It is assumed in FIG. 5a that the View Select is for meetings and appointments between 10/07 and 10/09 within the time span of 1:15PM on the 7th and 5:00 PM on the 9th. The calendar process represented by block 1 interacts with the View Criteria established in block 3 to determine what to select from the calendars of the individuals whose names and addresses appear on the Names List represented by block 2. The criteria in the example is for meetings and appointments with an assigned priority lower than 3 during the time span.

The calendar process of 1 determines the addresses of the individual calendars to be searched by reference to block 2. The search process is started on the local system, System 1, while the calendar object datastream containing the View Select Structure and the Names List Structure are sent to the remote system, System 2. The NML structure contains the System 2 addresses for the individuals that are attached to System 1 remotely through System 2.

Block 5 represents System 2 receiving the calendar object, acknowledging the receipt and processing the calendar object. The calendar process on System 2 is substantially the same as on System 1 except that a different set of calendars are inspected during the View Select function. If the Calendar Object was not a View Select request control is passed to block 10 representing some other calendar function. After completing that other process, control is returned to the calendar process block 5, and then to System 1.

If the calendar data is a View Select request blocks 6,7,8 and 9 are involved. Block 7 stores the Names List for use in addressing the calendars of the individuals on System 2. The individual calendars are searched as indicated by block 8., and a composite calendar is built as represented by block 9. The composite calendar for each individual is then sent back to System 1.

System 1 then invokes block 11 which displays the composite calendars representing the "selected view" requested earlier.

The following two program listings set forth the pseudocode statements that are involved in the view select object build process and the view select and composite calendar development process.

View Select Object Build Algorithm

This algorithm interacts with the View Criteria and the Names List to build the View Select Object.

```
1  .DO
1  .Interact with the View Criteria Classifications to build
   the correct View Select Calendar Object. The View Select
   Calendar Object will include combinations of the following
   calendar items: 1. A Specific entry, 2. Priority, 3. Calendar
   Classifications, 4. User Defined Fields, 5. Date(s), 6. Begin
   Time(s), 7. End Time(s).
1  .ENDDO
```

View Select and Composite Calendar Algorithm

Note: The View Select and Composite Calendar Algorithm is done at both the recipient node and at the initiating node. The view select process is done with close interaction with the Names List for the individuals whose calendars will be searched.

```
1  .DO UNTIL all calendars for the local individuals listed
   in the Names List have had a View Select consisting of the
   criteria in the selected time span completed and all indivi-
   duals at remote locations have had the View Select
   transmitted to their location.
2  ..IF the calendar is remote
2  ..THEN transmit the View Select to the recipient address
   at the remote node
2  ..ELSE locate the calendar for the selected individual
   associated with the View Select
2  ..ENDIF
2  ..DO UNTIL the entire calendar time span is searched
3  ...Fetch an item from the selected calendar
3  ...IF the item matches a view criteria item in the
   selected time span
3  ...THEN build the associated calendar object and add the
   item to a sequence of calendar objects to build an individual
   composite calendar
3  ...ENDIF
2  ..END DO UNTIL
1  .IF the composite calendar selection was initiated from a
   remote location
1  .THEN send the composite calendar object sequences back
   to the initiating node
1  .ELSE notify the initiator that the local composite
   calendar operation is complete
1  .ENDIF
```

Note: Remote transmissions of the View Select will result in a delay in the compilation of composite calendars. As each composite view is received the initiator may be notified (depends on transmit options selected). Results may be analyzed at any time.

It should also be understood that while the view select function has been described in connection with the scheduling of a meeting, it can be employed separately for a number of different purposes and applications as suggested earlier.

While the invention has been shown and illustrated with reference to a preferred embodiment, it will be understood by those skilled in the art that various modifications may be made without departing from the spirit of the invention and scope of the appended Claims. For example, it is possible for each real terminal to establish a number of virtual terminals, each of which would be assigned to a different individual who would maintain his calendar using the virtual terminal that would have a unique address.

We claim:

1. An electronic calendaring method for use in a data processing system having a plurality of interactive workstations, each of which is assigned to at least one individual who maintains a calendar on said system and in which a requesting calendar owner can enter a request to display a composite calendar having entries of a preselected duration within a predetermined time span from calendars of different said owners and which meet at least one specified non-temporal criteria, said method including the steps of;
   (a) establishing a first data structure for use by said system which includes at least one predefined field for storing said specified non-temporal criteria that is entered into said system when an event is being calendared by one of said owners,
   (b) establishing a second data structure for use by said system which includes at least one search criteria field for storing non-temporal search criteria entered into said system by said requesting calendar owner during entry of said request,
   (c) comparing said non-temporal search criteria stored in said search criteria field against said non-temporal criteria data in said at least one said predefined field of each calendar entry within said time span from calendars of selected said owners, and
   (d) selecting entries for said composite calendar only when said step of comparing indicates a predetermined relationship that includes said preselected duration.

2. The method set forth in claim 1, in which each said workstation includes a display and a keyboard, further including the step of displaying to said calendar owner a screen to assist said owner in calendaring said event.

3. The method set forth in claim 2, further including the step of entering a priority criteria into said system with said keyboard when said event is being calendared.

4. The method set forth in claim 3, in which said step of displaying said screen during the event calendaring process includes displaying a designated location for the individual calendaring the event to interactively enter said priority criteria.

5. The method set forth in claim 4, further including the step of storing said priority criteria in said one predefined field of said first data structure.

6. The method set forth in claim 5, in which said first data structure includes a plurality of other fields for storing non-temporal data that uniquely defines the event that is being calendared.

7. The method set forth in claim 4, further including the step of displaying to said requesting calendar owner, a second screen in response to said request for said composite calendar which includes at least one line for said requesting owner to interactively enter at least one non-temporal search criteria by keying in said search criteria with said keyboard.

8. The method set forth in claim 7, further including the step of storing said non-temporal search criteria in said second data structure.

9. The method set forth in claim 8, further including the step of entering a priority criteria as one of said non-temporal search criteria and storing said entered criteria in said at least one search criteria field.

10. The method set forth in claim 9, in which said step of selecting entries, selects all entries where said comparing step indicates that a calendar entry has a higher priority than the priority entered by said requesting owner as a search criteria.

11. The method recited in claim 7 further including the step of entering a logical combination of a plurality of non-temporal search criteria, at least one of which defines the type of calendared event to be selected.

12. The method recited in claim 11 in which a calendar entry is only selected by said step of selecting in response to said step of comparing indicating that said logical combination of a plurality of search criteria has been found in said first data structure.

* * * * *